(12) United States Patent
Grandidge

(10) Patent No.: US 10,830,974 B2
(45) Date of Patent: Nov. 10, 2020

(54) HYBRIDIZED CABLE ASSEMBLY

(71) Applicant: Ortronics, Inc., New London, CT (US)

(72) Inventor: Ryan J. Grandidge, Wakefield, RI (US)

(73) Assignee: Ortronics, Inc., New London, CT (US)

( * ) Notice: Subject to any disclaimer, the term of this patent is extended or adjusted under 35 U.S.C. 154(b) by 50 days.

(21) Appl. No.: 16/188,983

(22) Filed: Nov. 13, 2018

(65) Prior Publication Data

US 2019/0146169 A1 May 16, 2019

Related U.S. Application Data

(60) Provisional application No. 62/585,292, filed on Nov. 13, 2017.

(51) Int. Cl.
| | |
|---|---|
| *G02B 6/42* | (2006.01) |
| *H01B 9/00* | (2006.01) |
| *H01R 13/6461* | (2011.01) |
| *H04B 3/02* | (2006.01) |
| *H04L 12/10* | (2006.01) |
| *H01R 24/64* | (2011.01) |
| *H01R 31/06* | (2006.01) |

(52) U.S. Cl.
CPC .......... *G02B 6/4293* (2013.01); *G02B 6/428* (2013.01); *G02B 6/4277* (2013.01); *H01B 9/005* (2013.01); *H01R 13/6461* (2013.01); *H04B 3/02* (2013.01); *H01R 24/64* (2013.01); *H01R 31/065* (2013.01); *H04L 12/10* (2013.01)

(58) Field of Classification Search
CPC .... G02B 6/4293; G02B 6/4277; G02B 6/428; H01B 9/005; H01R 13/6461; H01R 24/64; H01R 31/065; H04B 3/02; H04B 10/808; H04L 12/10
See application file for complete search history.

(56) References Cited

U.S. PATENT DOCUMENTS

| | | | |
|---|---|---|---|
| 6,729,899 B2 * | 5/2004 | Aekins | H01R 13/6463 439/404 |
| 6,802,743 B2 * | 10/2004 | Aekins | H01R 13/6477 439/676 |

(Continued)

*Primary Examiner* — James M Perez
(74) *Attorney, Agent, or Firm* — McCarter & English, LLP

(57) ABSTRACT

The present disclosure provides advantageous cable assemblies (e.g., hybridized cable assemblies), and improved methods/systems for using the same. More particularly, the present disclosure provides improved systems/methods for the design and use of hybridized cable assemblies configured to facilitate the transfer of data and power. The present disclosure provides an advantageous hybridized cable assembly that is configured and adapted to transfer data and power across some length of a hybrid cable. An advantageous hybridized cable assembly can be configured to function with available hardware. Certain embodiments can utilize Power over Ethernet (PoE) technology to provide power to the hybridized cable assembly and subsequently to the end device. An exemplary hybridized cable assembly can transfer a combined transmission across some length of the hybridized cable assembly. The hybridized cable assembly can perform alterations to the incoming transmissions prior to outputting the combined transmission to a desired device.

18 Claims, 5 Drawing Sheets

(56) References Cited

U.S. PATENT DOCUMENTS

| | | | | |
|---|---|---|---|---|
| 6,893,296 B2* | 5/2005 | Aekins | H01R 13/6461 | 439/676 |
| 6,896,557 B2* | 5/2005 | Aekins | H01R 13/6461 | 439/676 |
| 7,037,140 B2* | 5/2006 | Aekins | H01R 13/6461 | 439/676 |
| 7,172,466 B2* | 2/2007 | Aekins | H01R 13/6461 | 439/676 |
| 7,280,032 B2* | 10/2007 | Aekins | H04B 3/32 | 340/12.32 |
| 7,485,010 B2* | 2/2009 | Aekins | H01R 13/41 | 439/620.13 |
| 7,508,297 B2* | 3/2009 | Martich | H04L 12/66 | 340/12.32 |
| 7,690,941 B2* | 4/2010 | Caveney | H01R 29/00 | 439/487 |
| 7,729,618 B2* | 6/2010 | Tatum | G06F 13/28 | 398/139 |
| 7,747,272 B2* | 6/2010 | Parsa | H04M 1/0293 | 455/522 |
| 7,860,398 B2* | 12/2010 | Tatum | G02B 6/4246 | 398/141 |
| 9,052,482 B1* | 6/2015 | Siddhaye | G02B 6/4293 | |
| 9,084,333 B2* | 7/2015 | Chandran | H05B 41/3928 | |
| 9,160,452 B2* | 10/2015 | Louderback | G02B 6/4293 | |
| 9,217,578 B2* | 12/2015 | Jo | F24F 11/62 | |
| 9,337,993 B1* | 5/2016 | Lugthart | H04L 7/0054 | |
| 9,565,036 B2* | 2/2017 | Zerbe | G06F 1/10 | |
| 9,722,822 B1* | 8/2017 | Zhang | H04L 25/03878 | |
| 9,768,978 B2* | 9/2017 | Coenen | H04L 12/403 | |
| 9,979,486 B2* | 5/2018 | Louderback | H04B 10/0797 | |
| 10,135,626 B2* | 11/2018 | Pischl | H04L 12/10 | |
| 10,247,893 B1* | 4/2019 | Elkayam | H01R 25/00 | |
| 10,277,330 B2* | 4/2019 | Sipes, Jr. | H04L 25/02 | |
| 10,461,809 B2* | 10/2019 | Merrick | H04B 3/02 | |
| 10,461,918 B2* | 10/2019 | Kobayashi | H04L 7/041 | |
| 2001/0038674 A1* | 11/2001 | Trans | H04L 7/0008 | 375/355 |
| 2004/0096004 A1* | 5/2004 | Wang | H04L 25/03885 | 375/257 |
| 2005/0061056 A1* | 3/2005 | Sunshine | G01N 29/022 | 73/23.2 |
| 2005/0159036 A1* | 7/2005 | Caveney | H01R 29/00 | 439/188 |
| 2006/0242458 A1* | 10/2006 | Feldman | G06F 11/1441 | 714/14 |
| 2007/0143509 A1* | 6/2007 | Ni | H01R 13/7175 | 710/100 |
| 2007/0237463 A1* | 10/2007 | Aronson | G02B 6/4292 | 385/89 |
| 2007/0237468 A1* | 10/2007 | Aronson | G02B 6/4284 | 385/100 |
| 2008/0250184 A1* | 10/2008 | Sheafor | G06F 13/385 | 710/306 |
| 2008/0267620 A1* | 10/2008 | Cole | H04B 10/0775 | 398/17 |
| 2008/0311797 A1* | 12/2008 | Aekins | H01R 13/41 | 439/676 |
| 2010/0283532 A1* | 11/2010 | Horan | G09G 5/003 | 327/530 |
| 2010/0302754 A1* | 12/2010 | Nordin | H04Q 1/035 | 361/810 |
| 2010/0325324 A1* | 12/2010 | Aronson | H01R 13/6658 | 710/63 |
| 2011/0080263 A1* | 4/2011 | Theile | G06F 13/385 | 340/10.1 |
| 2011/0228473 A1* | 9/2011 | Anderson | H04Q 1/08 | 361/679.58 |
| 2011/0243505 A1* | 10/2011 | Su | H01R 31/06 | 385/75 |
| 2011/0243567 A1* | 10/2011 | Su | G02B 6/241 | 398/117 |
| 2012/0154789 A1* | 6/2012 | Barrett | A61M 1/3609 | 356/41 |
| 2012/0269484 A1* | 10/2012 | Peto | H01R 24/60 | 385/76 |
| 2013/0202016 A1* | 8/2013 | Mohajeri | H04B 10/40 | 375/219 |
| 2013/0294731 A1* | 11/2013 | Van Der Mee | G02B 6/4284 | 385/76 |
| 2013/0340024 A1* | 12/2013 | MacDougall | H04N 21/43635 | 725/127 |
| 2014/0072264 A1* | 3/2014 | Schroder | H04J 14/00 | 385/76 |
| 2014/0156879 A1* | 6/2014 | Wong | G06F 11/3055 | 710/19 |
| 2014/0178015 A1* | 6/2014 | Tong | G02B 6/4284 | 385/88 |
| 2014/0185988 A1* | 7/2014 | Qi | G02B 6/4278 | 385/77 |
| 2014/0186023 A1* | 7/2014 | Louderback | H04B 10/071 | 398/16 |
| 2014/0273833 A1* | 9/2014 | McCormack | H04B 5/0037 | 455/41.1 |
| 2014/0308043 A1* | 10/2014 | Heidler | H01Q 1/007 | 398/115 |
| 2015/0078740 A1* | 3/2015 | Sipes, Jr. | H04B 10/808 | 398/16 |
| 2015/0086211 A1* | 3/2015 | Coffey | H04B 10/0795 | 398/116 |
| 2015/0110502 A1* | 4/2015 | Hosking | H04B 10/801 | 398/182 |
| 2015/0188245 A1* | 7/2015 | Coffey | H01R 13/6658 | 439/76.1 |
| 2015/0364876 A1* | 12/2015 | Grandidge | G02B 6/3897 | 385/135 |
| 2016/0020858 A1* | 1/2016 | Sipes, Jr. | H04L 12/10 | 398/45 |
| 2016/0028486 A1* | 1/2016 | Wilson | H04B 10/40 | 398/135 |
| 2016/0050029 A1* | 2/2016 | Huegerich | H04B 10/808 | 398/116 |
| 2017/0097484 A1* | 4/2017 | Teo | H05K 1/0216 |  |
| 2017/0117971 A1* | 4/2017 | Sipes, Jr. | H04L 12/10 |  |
| 2017/0212309 A1* | 7/2017 | Rossi | G02B 6/4292 |  |
| 2017/0285271 A1* | 10/2017 | Sipes, Jr. | G02B 6/4292 |  |
| 2017/0322378 A1* | 11/2017 | Declerck | H01R 43/005 |  |
| 2018/0017742 A1* | 1/2018 | Louderback | G02B 6/4415 |  |
| 2018/0219635 A1* | 8/2018 | Sipes, Jr. | G02B 6/3817 |  |
| 2018/0225230 A1* | 8/2018 | Litichever | G06F 9/45504 |  |
| 2018/0241436 A1* | 8/2018 | Kahlman | H04B 5/0037 |  |
| 2018/0287702 A1* | 10/2018 | Sambaraju | G02B 6/4293 |  |
| 2018/0375591 A1* | 12/2018 | Sipes, Jr. | G02B 6/4246 |  |
| 2018/0375672 A1* | 12/2018 | Thiers | H04L 12/10 |  |
| 2019/0028262 A1* | 1/2019 | Kobayashi | H04L 7/0037 |  |
| 2019/0118739 A1* | 4/2019 | Takamatsu | H04L 12/66 |  |
| 2019/0146169 A1* | 5/2019 | Grandidge | H01B 9/005 | 375/257 |
| 2019/0304630 A1* | 10/2019 | Goergen | H04L 12/40045 |  |
| 2020/0044751 A1* | 2/2020 | Goergen | H04L 12/40045 |  |
| 2020/0128685 A1* | 4/2020 | Al-Banna | H05K 5/03 |  |

* cited by examiner

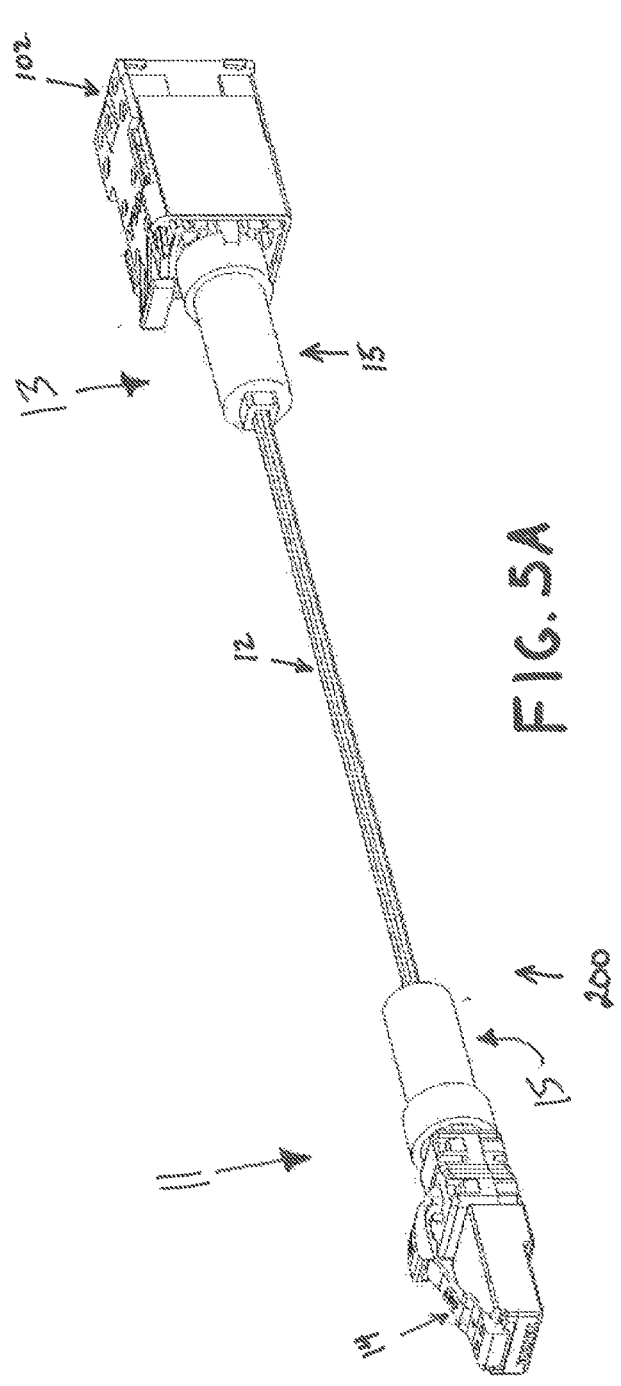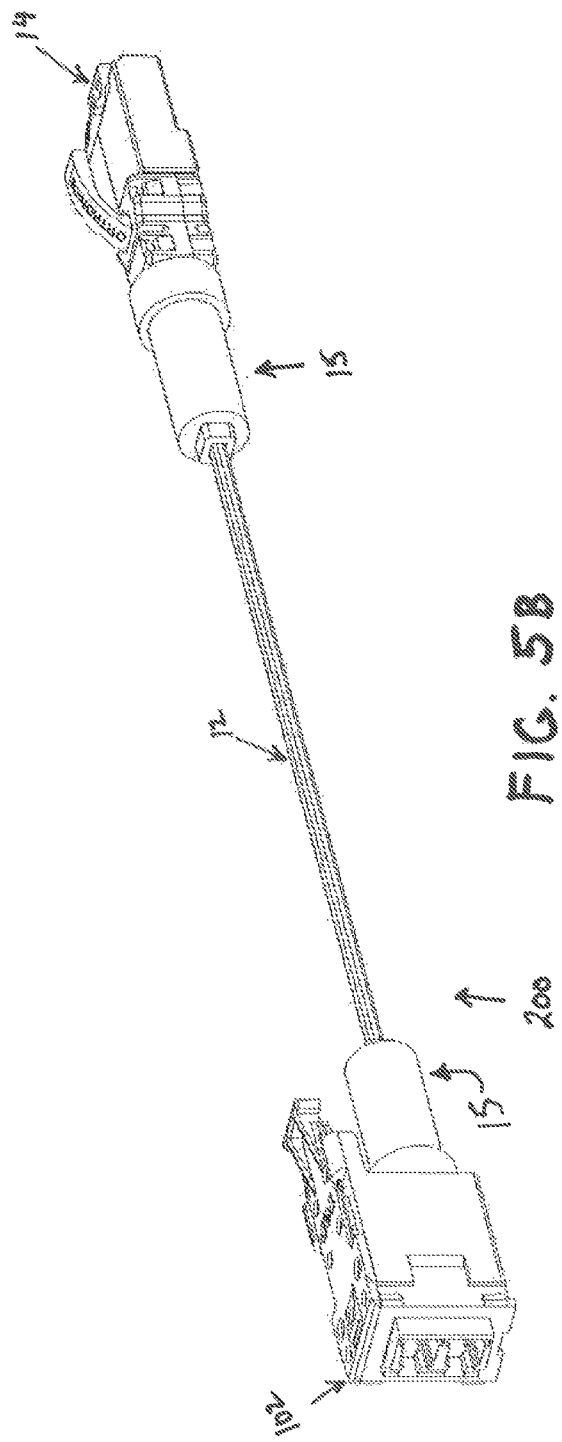
FIG. 5A
FIG. 5B

HYBRIDIZED CABLE ASSEMBLY

CROSS-REFERENCE TO RELATED APPLICATIONS

This application claims the benefit of U.S. Provisional Application entitled "Hybridized Cable Assembly," which was filed on Nov. 13, 2017, and assigned Ser. No. 62/585,292, the contents of which are herein incorporated by reference in their entirety.

FIELD OF THE DISCLOSURE

The present disclosure relates to cable assemblies (e.g., hybridized cable assemblies) and, more particularly to the design and use of hybridized cable assemblies configured to facilitate the transfer of data and power.

BACKGROUND OF THE DISCLOSURE

Traditionally, copper cables have been utilized for transferring data and power over some distance. However, copper cables can be affected by electromagnetic interference ("EMI") and further may not provide the necessary bandwidth over desired distances. Therefore, some active optical cables, utilizing fiber cables, have been developed to attempt to provide an upgrade over the traditional copper cable. However, some current active optical cable products, such as, RapidRun® Optical and Chromis Fiberoptics, are generally limited to data transfer only and typically require power to be added separately. This can result in additional wiring, increased labor costs, and the potential for interferences.

Based on the foregoing, a need exists for the combined transfer of data and power without substantial interference. Thus, an interest exists for improved cable assemblies, and related methods of use. These and other inefficiencies and opportunities for improvement are addressed and/or overcome by the assemblies, systems and methods of the present disclosure.

SUMMARY OF THE DISCLOSURE

The present disclosure provides advantageous cable assemblies (e.g., hybridized cable assemblies), and improved methods/systems for using the same. More particularly, the present disclosure provides improved systems/methods for the design and use of hybridized cable assemblies configured to facilitate the transfer of data and power.

In exemplary embodiments, the present disclosure provides an advantageous hybridized cable assembly that is configured and adapted to transfer data and power across some length of a hybrid cable. The present disclosure provides an advantageous hybridized cable assembly configured to function with available hardware. More particularly, certain embodiments of the present disclosure can utilize Power over Ethernet (PoE) technology to provide power to the hybridized cable assembly and subsequently to the end device.

In an exemplary embodiment, the hybridized cable assembly includes an active optical cable ("AOC") that further includes a copper portion and a fiber portion combined therein. The copper portion (or a material of similar functional qualities) is configured and adapted to transfer power from one end of the hybridized cable assembly to the other end. The fiber portion (or a material with similar functional qualities) is configured and adapted to transfer data from one end of the hybridized cable assembly to the other end. In some applications, it is noted that the hybridized cable assembly can be bi-directional.

The present disclosure provides for a cable assembly including a cable; at least one printed circuit board ("PCB") electrically connected to one end of the cable; and at least one connector electrically connected to an end of the PCB opposite the cable; wherein the cable is a hybridized cable that is configured and adapted to transfer power and data.

The present disclosure also provides for a cable assembly wherein the hybridized cable includes at least one copper cable and at least one fiber cable.

The present disclosure also provides for a cable assembly wherein the connector is an RJ-45 connector.

The present disclosure also provides for a cable assembly wherein the connector is detachable from the PCB.

The present disclosure also provides for a cable assembly wherein the PCB is configured and adapted to perform an alteration to an incoming transmission.

The present disclosure also provides for a cable assembly wherein the PCB is configured and adapted to modify an input voltage.

The present disclosure also provides for a cable assembly wherein the PCB is configured and adapted to scrub a power signal to remove external radio frequency ("RF") interference.

The present disclosure also provides for a cable assembly wherein the PCB is configured and adapted to provide a media access control address ("MAC address") to an end device.

The present disclosure also provides for a cable assembly wherein the hybridized cable includes two copper cables and two fiber cables.

The present disclosure also provides for a cable assembly wherein the hybridized cable is arranged in a ribbon.

The present disclosure also provides for a cable assembly wherein the hybridized cable is arranged in a circular cross-section.

The present disclosure also provides for a method of transferring a combined transmission including receiving a combined transmission into an input connector; separating the combined transmission prior to exiting the input connector; performing alterations to the separated transmissions with a PCB; and recombining the transmissions into a combined transmission prior to exiting an output connector; wherein the combined transmission includes power and data transmissions, and a hybridized cable carries the individual power and data transmissions between two points before the transmissions are recombined.

The present disclosure also provides for a method of transferring a combined transmission wherein the hybridized cable includes at least one copper cable and at least one fiber cable.

The present disclosure also provides for a method of transferring a combined transmission wherein the PCB modifies an input voltage.

The present disclosure also provides for a method of transferring a combined transmission wherein the PCB scrubs a power signal to remove external RF interference.

The present disclosure also provides for a method of transferring a combined transmission wherein the PCB provides a MAC address to an end device.

The present disclosure also provides for a method of transferring a combined transmission wherein the hybridized cable includes two copper cables and two fiber cables.

Any combination or permutation of embodiments is envisioned. Additional advantageous features, functions and applications of the disclosed systems, methods and assemblies of the present disclosure will be apparent from the description which follows, particularly when read in conjunction with the appended figures. All references listed in this disclosure are hereby incorporated by reference in their entireties.

BRIEF DESCRIPTION OF DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure.

Figure 1:
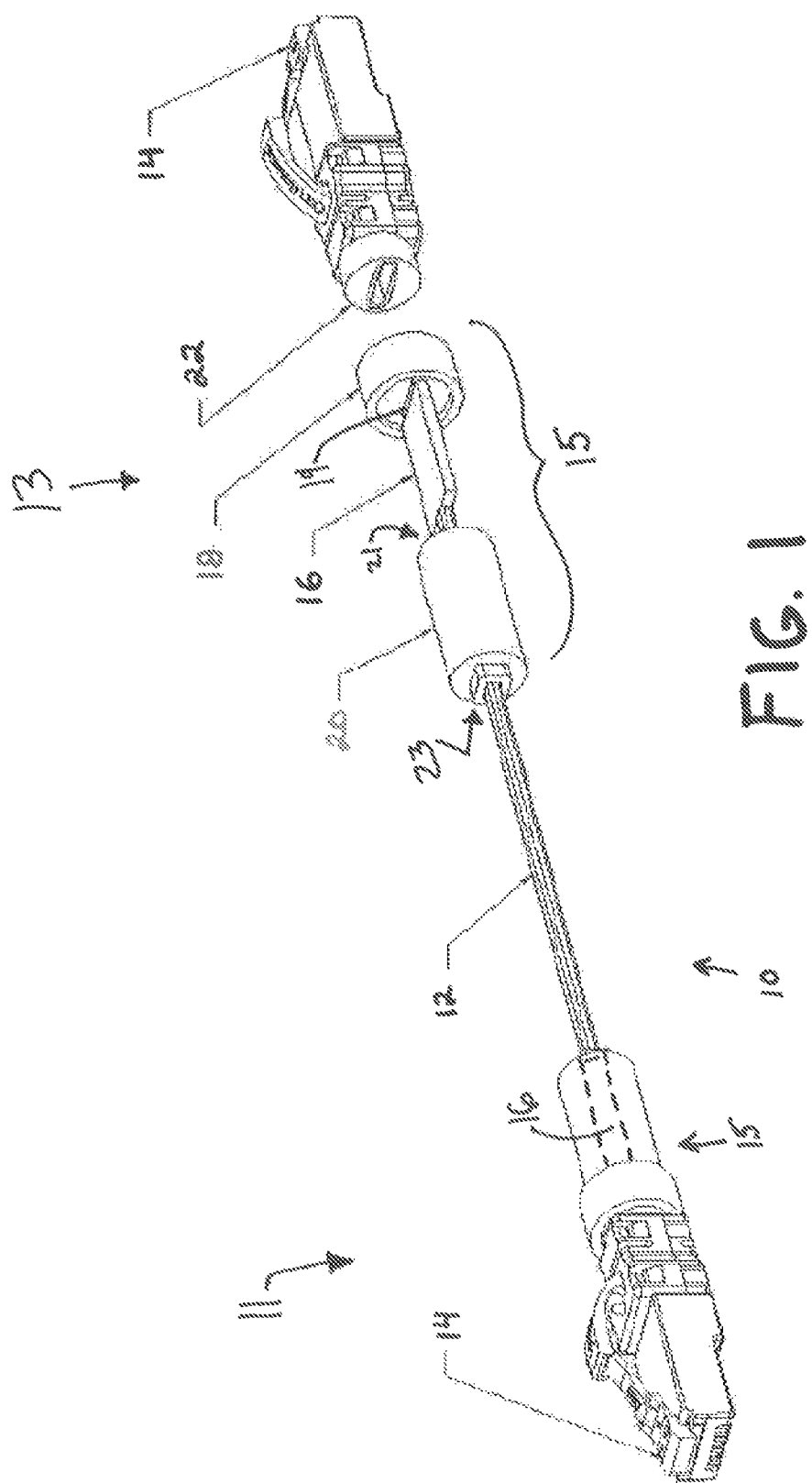
Figure 2:
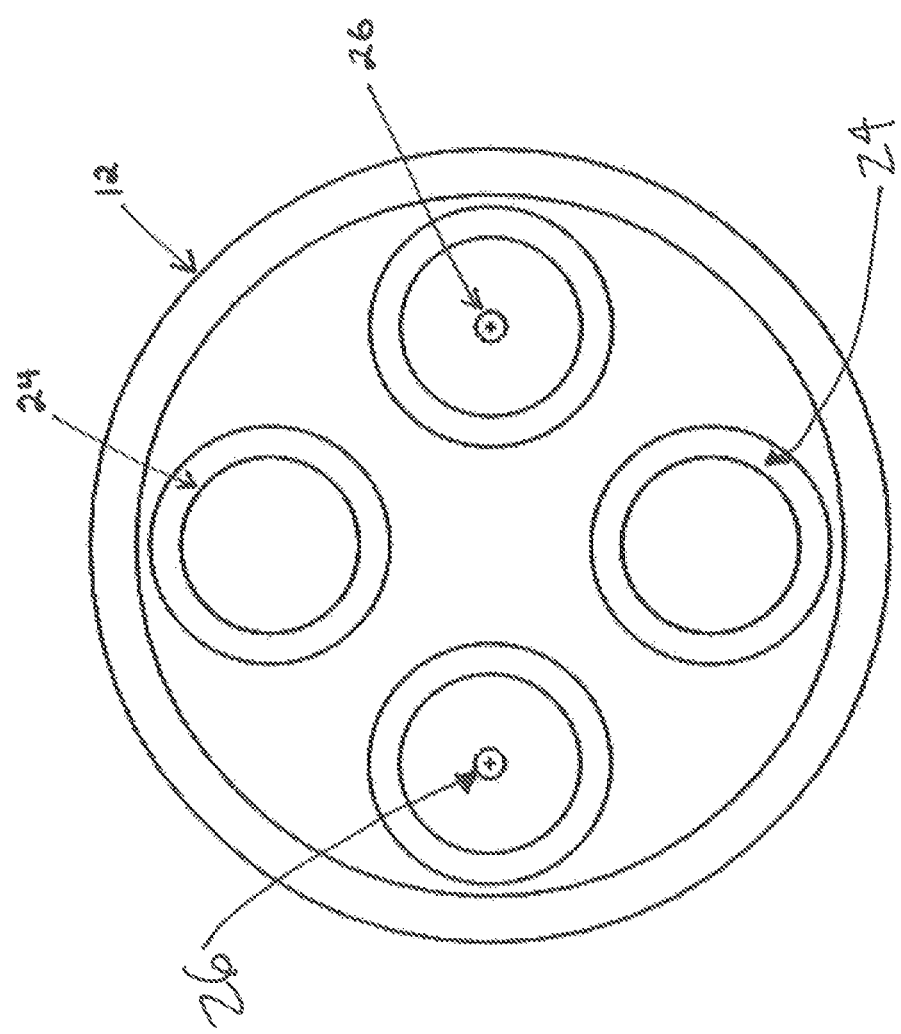
Figure 3:
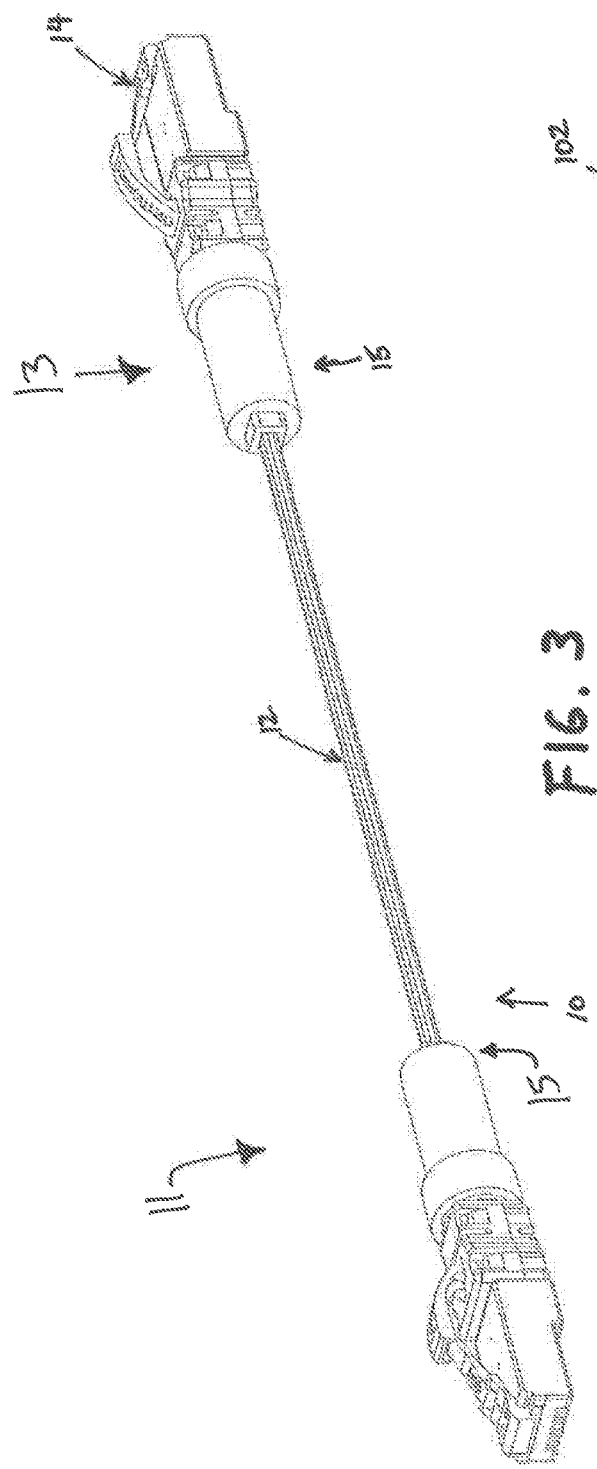
Figure 4:
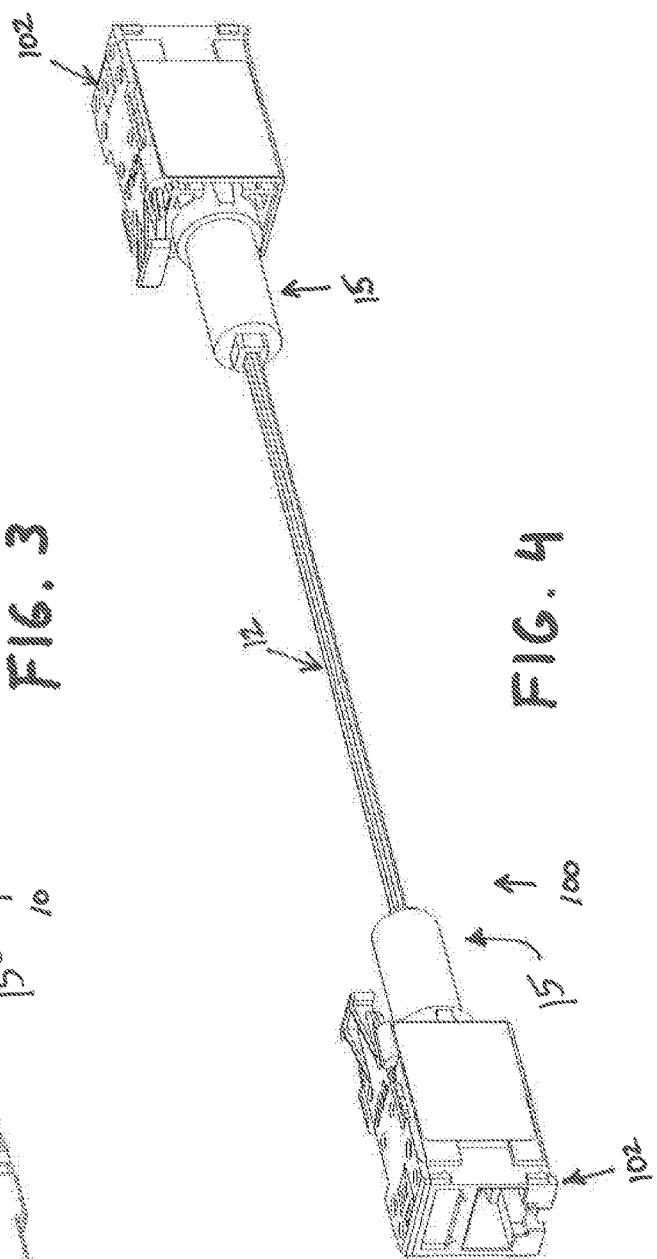
Figure 6:
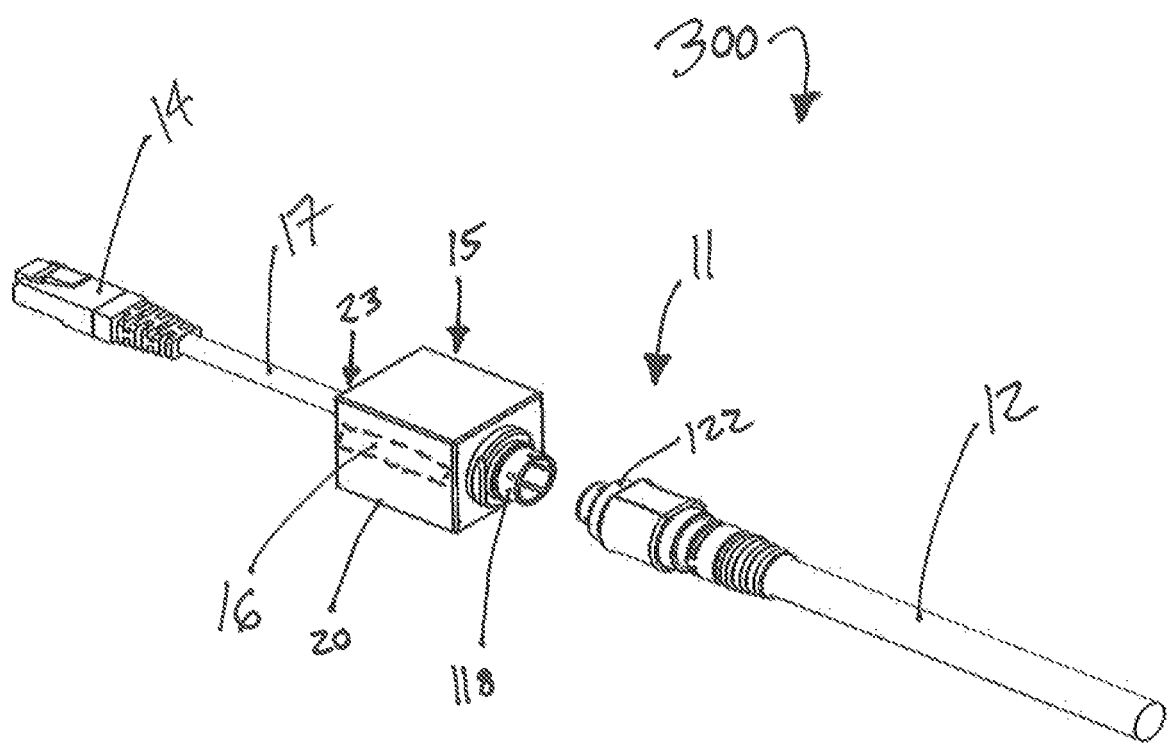

To assist those of ordinary skill in the art in making and using the disclosed assemblies, systems and methods, reference is made to the appended figures, wherein:

FIG. 1 schematically depicts an exploded perspective view of an exemplary hybridized cable assembly according to the present disclosure;

FIG. 2 schematically depicts a cross-section of an exemplary hybrid cable according to the present disclosure;

FIG. 3 schematically depicts a perspective view of an exemplary hybridized cable assembly according to the present disclosure;

FIG. 4 schematically depicts a perspective view of an exemplary hybridized cable assembly according to the present disclosure;

FIGS. 5A and 5B schematically depict perspective views of an exemplary hybridized cable assembly according to the present disclosure; and FIG. 6 depicts an exploded partial perspective view of an exemplary hybridized cable assembly according to the present disclosure.

DETAILED DESCRIPTION OF DISCLOSURE

The exemplary embodiments disclosed herein are illustrative of advantageous cable assemblies (e.g., hybridized cable assemblies), and systems of the present disclosure and methods/techniques thereof. It should be understood, however, that the disclosed embodiments are merely exemplary of the present disclosure, which may be embodied in various forms. Therefore, details disclosed herein with reference to exemplary assemblies/fabrication methods and associated processes/techniques of assembly and use are not to be interpreted as limiting, but merely as the basis for teaching one skilled in the art how to make and use the advantageous assemblies/systems (e.g., data and power transferring cable assemblies) and/or alternative assemblies of the present disclosure.

The present disclosure provides improved cable assemblies (e.g., hybridized cable assemblies), and advantageous methods/systems for using the same. More particularly, the present disclosure provides advantageous systems/methods for the design and use of hybridized cable assemblies configured to facilitate the transfer of data and power.

In exemplary embodiments, the present disclosure provides an advantageous hybridized cable assembly that is configured and adapted to transfer data and power across a length of a hybrid cable. An advantageous hybridized cable assembly can be configured to function with available hardware. Certain embodiments can utilize Power over Ethernet (PoE) technology to provide power to the hybridized cable assembly and subsequently to the end device. An exemplary hybridized cable assembly can transfer a combined transmission across a length of the hybridized cable assembly. The hybridized cable assembly can perform alterations to the incoming transmissions prior to outputting the combined transmission to a desired device.

Referring now to the drawings, like parts are marked throughout the specification and drawings with the same reference numerals, respectively. Drawing figures are not necessarily to scale and in certain views, parts may have been exaggerated for purposes of clarity.

FIG. 1 depicts an exemplary hybridized cable assembly 10 that is configured and adapted to transfer data and power across a length of hybridized cable assembly 10. In an exemplary embodiment, the hybridized cable assembly 10 includes an active optical cable ("AOC") 12 that further includes a copper portion 24 or the like, and a fiber portion 26 or the like, combined and/or incorporated therein (FIG. 2).

Copper portion 24 (or a material of similar functional qualities) is configured and adapted to transfer power from a first end 11 of hybridized cable assembly 10 to a second end 13. Fiber portion 26 (or a material with similar functional qualities) is configured and adapted to transfer data from first end 11 of hybridized cable assembly 10 to the second end 13. In some embodiments, the hybridized cable assembly 10 is bi-directional, with copper portion 24 also configured and adapted to transfer power from second end 13 to first end 11, and with fiber portion 26 also configured and adapted to transfer data from second end 13 to first end 11.

As shown in FIG. 1, hybridized cable assembly 10 further includes at least one printed circuit board ("PCB") 16 that is electrically connected to AOC 12. In an exemplary embodiment, assembly 10 includes two PCBs 16 electrically connected with AOC 12, with a first PCB 16 at first end 11 within first housing 15, and a second PCB at second end 13 within second housing 15. In general, each PCB 16 electrically and longitudinally bridges one end of AOC 12 to connector 14, e.g., RJ-45 plug/jack connector 14. However, other connectors can be incorporated without departing from the scope of this disclosure, e.g., HDMI, USB, as desired.

In some embodiments, each PCB 16 can be permanently attached to AOC 12 and semi-permanently attached to connector 14, wherein each PCB 16 and connector 14 are detachable from one another.

In other embodiments and as shown in FIG. 6, each PCB 16 of hybridized cable assembly 300 can be permanently attached to connector 14 (e.g., via cable 17) and semi-permanently attached to AOC 12, wherein each PCB 16 and AOC 12 are detachable from one another. Cable 17 can be a network cable 17 or the like.

It is to be appreciated that AOC 12 of FIG. 6 can extend to a second end 13 of assembly 300, and second end 13 of assembly 300 can include second connector 14 attached proximal to second end 13 of AOC 12 (e.g., via plugs 118, 122), and can include second housing 20 and second PCB 16 proximal to second end 13. In other embodiments, end 13 of AOC 12 of FIG. 6 can be hardwired directly into a device or the like. In other embodiments, it is noted that connector 14 of FIG. 6 can take the form of RJ-45 plug connector 102 or the like of FIG. 4.

Referring back to FIGS. 1 and 6, to protect each PCB 16, a plug 18, 118 and a cover 20, when combined together, form PCB housing 15, which encapsulates and/or houses PCB 16.

Exemplary plug 18, 118 includes a slot 19 that interfaces with a portion of PCB 16 to assist in performing a stable electrical connection with connector 14 and/or AOC 12. The slot 19 can include retention features to constrain PCB 16 from rotational or longitudinal movement. In an exemplary embodiment, PCB 16 includes a spade-like electrical connection that connects with connector 14 and a portion of said spade-like connection is retained by the slot 19. Plug 18 can be a cylindrical feature that interfaces with mating plug 22 on connector 14. Plugs 18, 22 can further include retention features to securely and releasably attach connector 14 and plug 18 to one another.

In another embodiment and as shown in FIG. 6, plug 118 of housing 15 is configured and dimensioned to interface with mating plug 122 on AOC 12 (e.g., on first end 11 of AOC 12 and/or on second end 13 of AOC 12). Plugs 118, 122 can further include retention features to securely and releasably attach AOC 12 and plug 118 to one another (e.g., via mating plug 122).

Exemplary cover 20 is a hollow feature or member (e.g., cylindrical, rectangular, polygonal, etc. feature or member 20), with a first opening 21 (e.g., large opening 21) that interfaces with plug 18, 118, and a second opening 23 (e.g., smaller opening 23), opposite the first opening 21, that interfaces with AOC 12 (FIG. 1), or interfaces with cable 17 of connector 14 (FIG. 6).

In some embodiments and as shown in FIG. 1, the second (smaller) opening 23 is slightly larger than the outside diameter of AOC 12 (or cable 17 of FIG. 6) to enable cover 20 to slide along AOC 12 to allow for easy access to PCB 16 (or to slide along cable 17 of FIG. 6 to allow for easy access to PCB 16).

Although plugs 18, 22, and cover 20 are depicted as cylindrical features in FIG. 1, the design is not limited to such and can include, for example, other shapes/sizes (e.g., rectangular, polygonal, triangular, elliptical, quadrilateral, etc.; see cover 20 of FIG. 6).

Plug 18, 118 and/or cover 20 can further include electromagnetic ("EM") shielding to reduce the electromagnetic field. Such materials for EM shielding can include, but are not limited to, sheet metal, metal screen, metal foam, metallic ink. Although AOC 12, PCB 16 and connector 14 are depicted as being assembled longitudinally, each can be assembled at least perpendicularly or the like with respect to the adjacent component.

Functionally, when input connector 14 (e.g., proximal first end 11) receives the incoming combined transmission, e.g., data and power, provided by the Power over Ethernet (PoE), connector 14 will split or separate the data and power and feed the respective separate transmissions to the attached PCB 16 for further processing. Once the separate data and power have reached the other end of hybridized cable assembly 10, output connector 14 (e.g., proximal second end 13) will recombine the signal and power into an outgoing combined transmission, thereby providing bi-directional communication. Although the term input connector 14 and output connector 14 are used to describe the bi-directional communication process, no specific connector 14 is solely considered the input or the output, either connector 14 can be the input or the output (e.g., connector 14 proximal to end 11 or 13 can be input connector 14; connector 14 proximal to end 11 or 13 can be output connector 14).

Each exemplary PCB 16 is configured and adapted to perform an optical/electrical conversion. In a two PCB 16 assembly, either PCB 16 or both can perform this conversion. PCB 16 will receive and transmit data from the optical fiber(s) 26 and also receive and transmit power provided by PoE over the copper wire(s) 24. Each PCB 16 can include circuitry to step up or step down (e.g., modify) the voltage in the copper wire(s) 24.

Each PCB 16 can also include circuitry to scrub the power signal to remove external radio frequency ("RF") interference. PCB 16 can further provide a media access control address ("MAC address") to the end equipment/device depending on the application, e.g., if AOC 12 was replacing an optical network terminal ("ONT") in a passive optical LAN ("POL") application.

FIG. 2 depicts an exemplary active optical cable ("AOC") 12 which includes at least one copper cable 24 and at least one fiber cable 26, combined and/or incorporated therein. As shown in FIG. 2, AOC 12 can include two copper cables 24 and two fiber cables 26.

In exemplary embodiments, each copper cable 24 and each fiber cable 26 runs the length of AOC 12 from first end 11 to second end 13 and provide the means for transferring power and data, respectively. It is noted that the internal fiber of fiber cable 26 can be glass optical fiber or plastic optical fiber (POF). POF can allow for easy field termination, if desired by a user. Furthermore, the fiber cable 26 can include a pair of fibers, a ribbon of multiple pairs of fibers, or a functionally similar design.

Copper cable 24 may include a twisted pair or straight, and may further include electromagnetic ("EM") shielding. Copper cable 24 can be large enough in diameter to support the power requirements for POE applications. The exemplary cables 24, 26 are insulated in a protective coating/shield to ensure the cables 24, 26 remain isolated from each other. Furthermore, by limiting the data to only pass through the fiber cable 26 and not the copper cable 24, interference of the data will be significantly reduced or even substantially eliminated. Although AOC 12 is depicted with a circular cross-section, AOC can also be arranged in a ribbon, or can include other shapes/forms or cross-sections.

FIG. 3 depicts fully assembled hybridized cable assembly 10 as was described with reference to FIG. 1. Although hybridized cable assembly 10 depicts two RJ-45 jack connectors 14 and two PCB housings 15, hybridized cable assembly 10 can function with only one of each.

In some applications where one end of AOC 12 is hardwired directly into a device, only one set of PCB housing 15 and connector 14 is required. Functionally, the bandwidth of data transferred over some distance is a function of the construction of the PCB and AOC 12.

In one example, bandwidths exceeding about 100 gigabytes can be achieved at distances of about 100 meters. In another example, data can be transferred with a bandwidth of about 10 gigabytes over a distance exceeding about 300 meters. These examples are not meant to be limiting of the potential bandwidth or distance that is achievable, they are merely exemplary and assist those persons skilled in the art to make and use the hybridized cable assemblies of the present disclosure.

In another embodiment, FIG. 4 depicts fully assembled hybridized cable assembly 100. Hybridized cable assembly 100 is substantially similar to hybridized cable assembly 10, as illustrated in FIGS. 1 and 3, however, the assembly 100 includes two RJ-45 plug connectors 102. Hybridized cable assembly 100 functions similar to hybridized cable assembly 10 and such explanation can be referenced to assist those persons skilled in the art to make and use hybridized cable assembly 100.

In another embodiment, FIGS. 5A and 5B depict a fully assembled hybridized cable assembly 200. Hybridized cable assembly 200 includes one RJ-45 jack connector 14 and one RJ-45 plug connector 102. Hybridized cable assembly 200 functions similar to hybridized cable assembly 10 and such explanation can be referenced to assist those persons skilled in the art to make and use hybridized cable assembly 200. It is noted that there could also be an application where a fiber duplex pair is directly plugged into one jack side and converted to RJ-45 on the opposite end of the link with POE added at the RJ-45 side.

There are many applications for assembly 10, 100, 200 and/or 300. Such exemplary applications include, without limitation, new building design, consumer home applications, internet of things (TOT), replacement for high bandwidth copper applications (e.g., CAT 8 and higher), and they may be used in SNAP applications or the like.

There are many benefits or advantages for utilizing assembly 10, 100, 200 and/or 300. Such exemplary advantages include, without limitation, high bandwidth (e.g., about 40 to about 100 Gig possible depending on construction of the PCB 16 and cable 12); uses POE; can function with available hardware (e.g., RJ-45 connection); reduces/eliminates interference (e.g., Alien Cross talk); cable 12 can be run in the same pathways as existing power lines (reduced install cost); easier handling and installation than fiber alone; can support power/data for IOT devices; in a POL application one may be able to replace the ONT; cable diameter can be reduced compared to copper cable; data can be transferred with higher bandwidth over longer distances than copper (e.g., CAT 8 limitations) (greater than 30 m, 100 to 300 meter lengths possible); if POF is used, field termination can be simple.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

The invention claimed is:

1. A cable assembly, comprising:
a hybridized cable that extends from a first end to a second end;
a printed circuit board ("PCB") that extends from a first PCB end to a second PCB end, the first PCB end of the PCB electrically connected to the first end of the cable; and
a connector electrically connected to the second PCB end of the PCB;
wherein the hybridized cable is configured and adapted to transfer power using at least one copper wire and transfer data using at least one optical fiber,
wherein an electrical input signal for the hybridized cable includes both electronic data and electrical power on the same conductors, and
wherein the hybridized cable is detachable from the PCB.

2. The cable assembly of claim 1, wherein the connector is an RJ-45 connector.

3. The cable assembly of claim 1, wherein the connector is detachable from the PCB.

4. The cable assembly of claim 1, wherein the PCB is configured and adapted to perform an alteration to an incoming transmission.

5. The cable assembly of claim 4, wherein the PCB is configured and adapted to modify an input voltage.

6. The cable assembly of claim 4, wherein the PCB is configured and adapted to scrub a power signal to remove external radio frequency interference.

7. The cable assembly of claim 4, wherein the PCB is configured and adapted to provide a media access control address to an end device.

8. The cable assembly of claim 1, wherein the hybridized cable includes two copper wires and two optical fibers.

9. The cable assembly of claim 1, wherein the hybridized cable is arranged in a ribbon or a circular cross-section.

10. The cable assembly of claim 1, wherein the hybridized cable is configured and adapted to transfer power and data in an analog manner.

11. The cable assembly of claim 1, wherein the PCB is releasably housed in a housing, the housing configured to travel along the hybridized cable to allow access to the PCB.

12. A method of transferring combined power and data transmissions using a hybridized cable, the method comprising:
receiving the combined power and data transmissions into an input connector;
separating the combined power and data transmissions prior to exiting the input connector;
performing alterations to the separated power and data transmissions with a printed circuit board ("PCB");
transferring, using the hybridized cable, the altered power transmissions using at least one copper wire;
transferring, using the hybridized cable, the altered data transmissions using at least one optical fiber; and
recombining the transferred transmissions into a combined transmission prior to exiting an output connector;
wherein the hybridized cable carries the individual power and data transmissions between two points before the transmissions are recombined;
wherein an electrical input signal for the hybridized cable includes both electronic data and electrical power on the same conductors; and
wherein the hybridized cable is detachable from the PCB.

13. The method of claim 12, wherein the PCB modifies an input voltage.

14. The method of claim 12, wherein the PCB scrubs a power signal to remove external radio frequency interference.

15. The method of claim 12, wherein the PCB provides a media access control address to an end device.

16. The method of claim 12, wherein the hybridized cable includes two copper wires and two optical fibers.

17. A cable assembly, comprising:
a hybridized cable that extends from a first end to a second end;

a first printed circuit board ("PCB") electrically connected to the first end of the cable;
a second PCB electrically connected to the second end of the cable;
a first connector electrically connected to the first PCB;
a second connector electrically connected to the second PCB;
wherein the hybridized cable is configured and adapted to transfer power using at least one copper wire and transfer data using at least one optical fiber,
wherein an electrical input signal for the hybridized cable includes both electronic data and electrical power on the same conductors, and
wherein the hybridized cable is detachable from at least one of the first PCB or the second PCB.

18. The cable assembly of claim 17, wherein the first or second PCB is configured and adapted to perform an alteration to an incoming transmission;
wherein the first or second PCB is configured and adapted to modify an input voltage;
wherein the first or second PCB is configured and adapted to scrub a power signal to remove external radio frequency interference; and
wherein the first or second PCB is configured and adapted to provide a media access control address to an end device.

* * * * *